US010076972B2

(12) United States Patent
Düvel et al.

(10) Patent No.: US 10,076,972 B2
(45) Date of Patent: Sep. 18, 2018

(54) VEHICLE-ELECTRICAL-SYSTEM ASSEMBLY AND METHOD FOR OPERATING A VEHICLE ELECTRICAL SYSTEM OF AN ELECTRICALLY DRIVABLE MEANS OF TRANSPORTATION HAVING A FUEL CELL (71) Applicant: VOLKSWAGEN AKTIENGESELLSCHAFT, Wolfsburg (DE)

(72) Inventors: Marc Düvel, Cremlingen (DE); Alexander Wess, Wolfsburg (DE); Özgür Aktas, Salzgitter (DE); Hendrik Schröder, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 15/501,894

(22) PCT Filed: Jun. 29, 2015

(86) PCT No.: PCT/EP2015/064657
§ 371 (c)(1),
(2) Date: Feb. 6, 2017

(87) PCT Pub. No.: WO2016/020117
PCT Pub. Date: Feb. 11, 2016

(65) Prior Publication Data
US 2017/0225590 A1    Aug. 10, 2017

(30) Foreign Application Priority Data
Aug. 6, 2014   (DE) .................. 10 2014 215 536

(51) Int. Cl.
*B60L 15/20* (2006.01)
*B60L 11/18* (2006.01)
*B60L 1/00* (2006.01)

(52) U.S. Cl.
CPC ............ *B60L 15/2045* (2013.01); *B60L 1/00* (2013.01); *B60L 11/1881* (2013.01); *B60L 11/1887* (2013.01)

(58) Field of Classification Search
CPC .............. B60L 15/2045; B60L 11/1881; B60L 11/1887; B60L 1/00
See application file for complete search history.

(56) References Cited

U.S. PATENT DOCUMENTS 5,991,670 A * 11/1999 Mufford et al. .... B60L 11/1881
701/22
7,059,436 B2 * 6/2006 Iwasaki ............... B60L 11/1887
701/22

(Continued)

FOREIGN PATENT DOCUMENTS

DE    4322765 C1    6/1994
DE   19810467 C1   10/1999

(Continued)

OTHER PUBLICATIONS

Search Report and Written Opinion for International Patent Application No. PCT/EP2015/064657; dated Sep. 30, 2015.

*Primary Examiner* — Dale W Hilgendorf
(74) *Attorney, Agent, or Firm* — Barnes & Thornburg LLP (57) ABSTRACT A vehicle-electrical-system assembly and a method for operating a vehicle electrical system of an electrically drivable transportation unit. The method includes determining a present electrical power consumption of a component having dynamic power-consumption behavior at a first time, providing a base value by smoothing the power-consump- (Continued)

tion behavior over time, defining a power reserve for the component by adding a static power offset to the base value, and limiting a vehicle-electrical-system power available for a traction machine of the transportation unit to provide the defined power reserve for the component.

12 Claims, 6 Drawing Sheets

(56) References Cited

U.S. PATENT DOCUMENTS

| | | | |
|---|---|---|---|
| 2004/0065488 A1* | 4/2004 | Hightower | B60L 15/2045 180/65.1 |
| 2005/0039630 A1* | 2/2005 | Kumar et al. | B60L 15/2045 105/35 |
| 2011/0076584 A1 | 3/2011 | Katano | |

FOREIGN PATENT DOCUMENTS

| | | |
|---|---|---|
| DE | 10160480 A1 | 6/2003 |
| DE | 102007036665 A1 | 3/2009 |
| DE | 112009001410 T5 | 4/2011 |
| EP | 0771688 A1 | 5/1997 |
| WO | 2014103823 A1 | 3/2014 |

* cited by examiner

VEHICLE-ELECTRICAL-SYSTEM ASSEMBLY AND METHOD FOR OPERATING A VEHICLE ELECTRICAL SYSTEM OF AN ELECTRICALLY DRIVABLE MEANS OF TRANSPORTATION HAVING A FUEL CELL

PRIORITY CLAIM

This patent application is a U.S. National Phase of International Patent Application No. PCT/EP2015/064657, filed 29 Jun. 2015, which claims priority to German Patent Application No. 10 2014 215 536.3, filed 6 Aug. 2014, the disclosures of which are incorporated herein by reference in their entirety.

SUMMARY

Illustrative embodiments relate to an island electrical system arrangement, "vehicle electrical system arrangement" in the text which follows, and to a method for operating an island electrical system, called "vehicle electrical system" in the text which follows, of a means of transportation which can be electrically driven. Illustrative embodiments relate to power management when dynamic power consumers are present in an island electrical system/vehicle electrical system.

BRIEF DESCRIPTION OF THE DRAWINGS

Exemplary embodiments will be described in detail below with reference to the accompanying drawings, in which.

DETAILED DESCRIPTION OF THE DISCLOSED EMBODIMENTS

The electrification of personal individual transport means is advancing rapidly at present. One concept for supplying electrical energy to vehicles and other means of transportation is based on the use of fuel cells. The fuel cells are supplied with fresh air and therefore oxygen, for example, by means of a turbocompressor, compressor or fan which is electrically driven. If a high power output of the fuel cell is required, a high rotation speed of the turbocompressor has to be produced, this being done, for example, using energy which is electrochemically stored in the vehicle electrical system (for example, in a battery). For dynamic processes, it is therefore necessary to keep a certain power capacity ready for dynamic components (for example, the turbocompressor). Consequently, this proportion cannot be used for electrically driving or boosting the vehicle without resulting in losses in torque which are noticeable to the driver.

DE 10 2007 036 665 A1 discloses a method for adjusting the power capacity of a vehicle electrical system depending on the situation, in which method the power which is to be provided by the vehicle electrical system for the electromechanical loads of the vehicle electrical system is predefined depending on the currently required electrical power by adapting the minimum voltage of the vehicle electrical system. To ensure operation of the vehicle electrical system, a worst-case consideration of the realizable maximum power of the loads is performed and the vehicle electrical system voltage is set accordingly. Probability consideration is proposed for suddenly increasing power levels to reduce the probability of overloading of the vehicle electrical system.

DE 198 10 467 C1 discloses a hybrid drive concept for fuel cell-operated vehicles, in which hybrid drive concept two separate electrical circuits, which are provided with switching apparatuses, are provided for selectively connecting the electric drive motor or the electrical auxiliary load to a fuel cell or an energy store. Depending on the switching states, auxiliary loads, energy stores and fuel cells can be interconnected in accordance with the vehicle operating states.

DE 101 60 480 A1 discloses a method and a device for controlling mechanical, electrical and thermal power flows in a motor vehicle in a coordinated manner. In this case, different types of electrical power reserves are described by means of quality measures and a setpoint operating state for the motor vehicle is determined on this basis.

Improved methods for managing power reserves in vehicle electrical systems are required.

Disclosed embodiments provide a method and a vehicle electrical system arrangement. The method serves to operate a vehicle electrical system of a means of transportation which can be electrically driven and which has, for example, a fuel cell as an energy store. In a first operation, a current electrical power consumption of a component (for example, a load) with dynamic power consumption behavior is ascertained. A turbocompressor for a fuel cell exhibits dynamic power consumption behavior of this kind. The high rotation speed and acceleration and the mass which is to be accelerated in this case, in conjunction with the output power of the turbocompressor, also provide for high dynamic processes in the vehicle electrical system. In a second operation, a base value for the power consumption behavior of the component is provided by smoothing the power consumption behavior over time. In other words, a base value function ("time-variable base value") is provided by smoothing the power consumption behavior of the component. A power reserve for the component is then defined by adding a static power offset to the previously ascertained base value. In this way, the power consumption of the turbocompressor for the stationary operating situation is represented by the base value, and the power consumption for dynamic processes of the turbocompressor on the vehicle electrical system is taken into consideration and made available by the power offset.

A vehicle electrical system power, which is available for a traction machine of the means of transportation, for providing the defined power reserve is then limited. For example, the traction machine of the means of transportation can be actuated in such a way that the power consumption of the traction machine does not lower the vehicle electrical system power, which is available for the component, below the defined power reserve. The available vehicle electrical system power can be provided, for example, substantially by an electrochemical energy store which can provide the electrical power required for the component substantially without delay. For example, conventional batteries have a corresponding terminal behavior. It is possible, for example, to start up a turbocompressor for operating a fuel cell without there being a delay in the process on account of an excessively low available electrical power. This improves the dynamic behavior of, for example, means of transportation which are driven by means of fuel cells.

It is possible to identify, at a second time, that the current electrical power consumption of the component is greater than the power reserve. In response to this, the power reserve can be increased at least to a value which corresponds to the current electrical power consumption of the component at the second time. By way of example, the electrical power consumption of an electrically driven traction machine of the means of transportation can be limited for this purpose. Depending on the operating state of further electrical loads, the electrical power consumption of the further electrical loads can also be reduced or suspended to increase the power reserve.

To avoid an excessively low power reserve, the base value can be corrected at those points at which the current electrical power consumption of the component at the second time is or was greater than the power reserve. In this way, a corrected base value can be provided for the future, the base value, in conjunction with a static power offset, being defined as a future power reserve. In this way, the required electrical power capacity of the vehicle electrical system for operating the component can be ensured even more reliably.

Further, the method can comprise identifying a stationary operating state of the component, wherein the operating state is characterized by a maximum operating point of the system (for example, maximum rotation speed or power output of the fuel cell, generally less than maximum electrical power consumption) of the component. In other words, an operating point is "sought" in which no further dynamic processes which require a higher electrical power than the current power consumption of the component occur. In response to the stationary operating state being identified, the power reserve for the component can be reduced. This can be done, for example, by reducing the static offset and/or the base value. The stationary operating state of the component is reached at a maximum rotation speed of a turbocompressor for a fuel cell since acceleration processes which require additional energy have died down at this point. An operating state of this kind is associated with a maximum electrical output power of an associated fuel cell, so that a further increase in the required power is not possible. The power which has been released by reducing the power reserve can be used for electrically driving the means of transportation, for example, in the case of a long-lasting acceleration state of the means of transportation. In this way, the driving behavior of the means of transportation can be more flexible than is possible according to the prior art.

The power reserve in the stationary operating state of the component can be reduced, for example, in operations over time. For example, different (decreasing) percentages of a power reserve which was initially made available can be realized at predefined times/time operations. As an alternative or in addition, the power reserve can be reduced after a predefined time period since the stationary operating state was identified. In addition, the power reserve can be reduced continuously to prevent the power which is released, for example, for a traction machine of the means of transportation, leading to fluctuations in the drive torque which are noticeable to the driver.

The component can be, for example, an air-conditioning compressor, a turbocompressor, a screw-type compressor, a hydraulic assembly, an (electric) heater, an electric motor, a power electronics system or a charging device. The above-mentioned examples constitute vehicle electrical system loads which can develop or call up a sometimes considerable load comparatively dynamically. In this case, the disclosed method can allow reliable operation of the component without losses in comfort.

Edge gradients can be reduced when smoothing the power consumption behavior over time to create the base value/the base function. The rising edges can be smoothed in a different way to the falling edges. If, for example, a section with positive gradients is smoothed to a lesser extent to clearly depict a particularly dynamic increase in the power consumption behavior or the base value ascertained from it, sections with a negative gradient can be smoothed to a lesser extent to initially keep an increased power reserve ready in the event of a dropping power consumption, before obviously severely changing processes on the vehicle electrical system have died down. Other filtering or "smoothing variants" can also be used according to the disclosed embodiments.

A power reserve can be defined as proposed, for example, in a first operating state of the vehicle electrical system and applied in a second operating state which is similar or identical to the first operating state. By way of example, the measurement data of power consumption operations and power consumption characteristics of individual loads and/or information about expected processes on the vehicle electrical system can be used for this purpose. If comparison with first operating states which are made available in a data memory and for which a power reserve has been ascertained shows that a current operating state is similar or identical, the buffer store can be matched to corresponding power conditions even before the power conditions occur, to allow reliable operation of electrically dynamic components without losses in comfort.

A second disclosed embodiment proposes a vehicle electrical system arrangement for a means of transportation which can be electrically driven. The vehicle electrical system arrangement comprises at least one component with dynamic power consumption behavior (for example, a turbocompressor of a fuel cell of the means of transportation), at least one electrical energy source or energy converter for supplying power to the vehicle electrical system (for example, a traction battery/a starter battery, fuel cell), at least one energy consumer (for example, traction motor), a processing unit (for example, an electrical control device comprising a microcontroller) and a detection unit for detecting electrical processes on the vehicle electrical system or in components of the vehicle electrical system. The detection unit can also be designed as an electrical control device and be designed, for example, in one physical unit together with the processing unit. On account of the above-mentioned hardware, the vehicle electrical system arrangement is designed to execute a disclosed method. The features, combinations of features and the benefits resulting from the features and combinations of features clearly correspond to the benefits stated in conjunction with the disclosed method in such a way that reference is made to the above statements to avoid repetition.

A third disclosed embodiment proposes a means of transportation which can be electrically driven (for example, a vehicle, a passenger car, a transporter or a truck) which comprises a vehicle electrical system arrangement according to the second disclosed embodiment. If the means of transportation comprises a fuel cell as a traction energy source and an electrochemical energy store for supporting the vehicle electrical system, the power capacity of a turbocompressor which is used for operating the fuel cell can be ensured according to the disclosed embodiments and the flexibility of the means of transportation can be increased.

Figure 1:
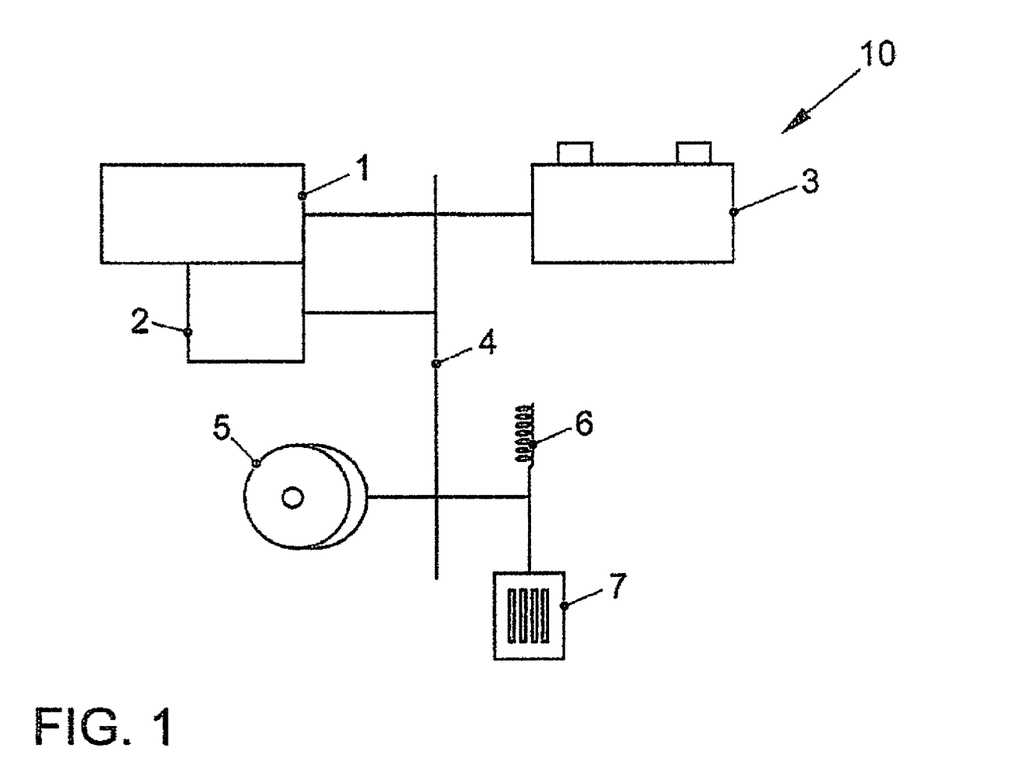
FIG. 1 shows a basic diagram of a vehicle electrical system arrangement according to an exemplary embodiment.

FIG. 1 shows a schematic diagram of a vehicle electrical system arrangement 10 which is supplied with electrical energy by a battery 3, as an electrochemical energy store, and a fuel cell 1. A traction machine 5, a heating device 6 and an air-conditioning system 7 are electrically connected to the fuel cell 1 and the starter battery 3 by means of electrical lines 4. An electrical turbocompressor 2 as a component with dynamic power consumption behavior is provided for operating the fuel cell 1. The turbocompressor 2 is likewise supplied with electrical energy by means of the electrical lines 4.

Figure 2:
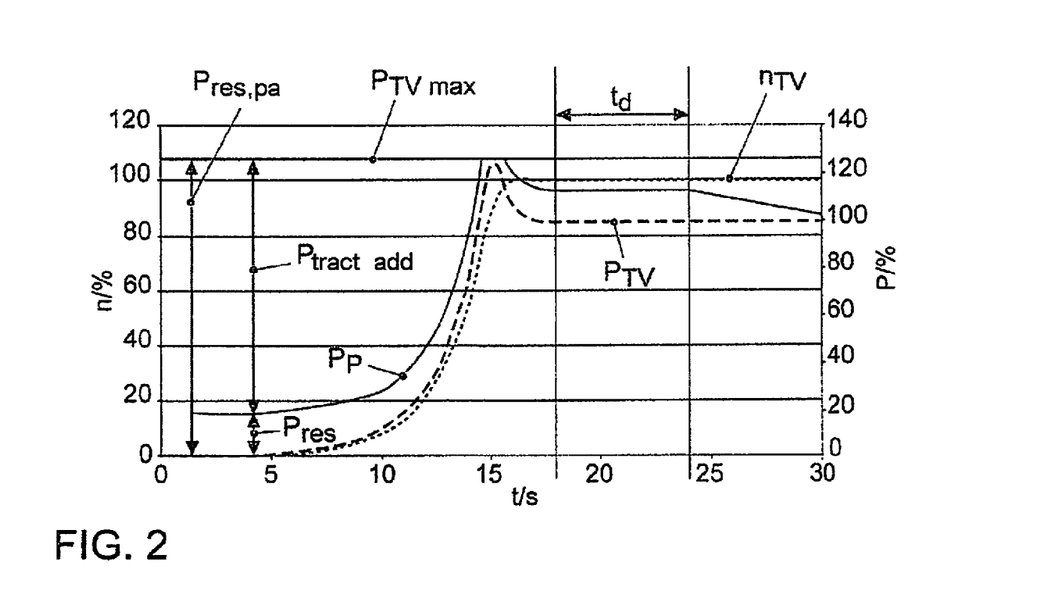
FIG. 2 shows a rotation speed/time and power/time graph illustrating the manner of operation of an exemplary embodiment of a vehicle electrical system arrangement.

FIG. 2 shows, using a power/time graph, a state of increasing power output of a fuel cell, wherein the rising rotation speed n (in percent) for the turbocompressor of the fuel cell is plotted with respect to time t. In addition, the electrical power consumption PTV (in percent) for the turbocompressor is also plotted with respect to time t. On account of dying-down dynamic processes when the rotation speed of the turbocompressor increases, the power consumption PTV after a maximum electrical power consumption PTV max is reached decreases again even though the absolute rotation speed nTV initially continues to slowly increase.

According to the prior art, it was ensured that the turbocompressor was ready for operation by making available the maximum power consumption PTV max. However, this maximum power consumption occurs only in a limited time period. However, the power reserve Pres,pa is reserved over the entire time period. For this reason, the power reserve PRes is dynamically adapted, so that it is ensured that enough power reserves are available at any time. On account of the reserved power reserve which is lower than in the prior art (Pres,pa>Pres), this leads to an increase in the power potential of the traction drive Ptrac,add. Since a lower power consumption PTV can be expected after the maximum electrical power consumption PTV max as illustrated is reached, the power reserve Pres is furthermore gradually reduced. After a maximum power PTV is reached and a (locally) stationary operating point is identified, the power reserve Pres is maintained for a predefined time period td and then reduced only to provide additional power Ptract add to the traction machine. The power reserve Pres represents the difference between the buffer store power Pp, which is provided for the turbocompressor, and the power PTV which is currently consumed by the turbocompressor. Therefore, a power reserve Ptract add which is mobilized and can be provided, for example, to a traction machine of a means of transportation is produced between the maximum power consumption PTV max and the power Pp. As a result, increased flexibility of the means of transportation is ensured in operating states of the electrical component in which no further increase in the electrical power consumption of the electrical component is expected. In other words, full-load states (powerful acceleration or traveling at particularly high speed) can be influenced.

Figure 3:
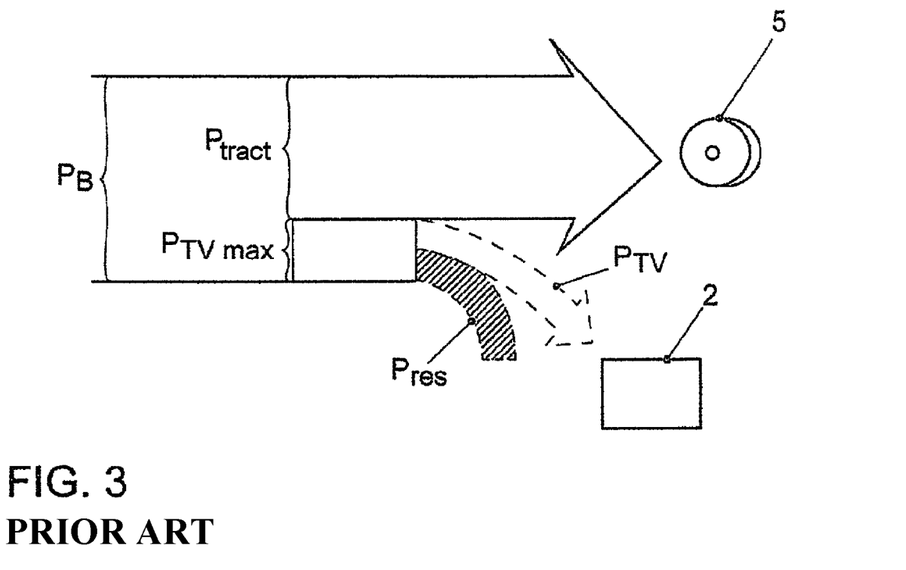
FIG. 3 shows a power branch diagram illustrating power flows in an example of a means of transportation, which can be electrically driven, according to the prior art.

FIG. 3 shows the power flow of a power PB which is provided in the vehicle electrical system, the majority Ptract of the power being supplied to a traction machine 5 of a means of transportation. As is customary in the prior art, a fixed proportion PTV max is reserved for use by the turbocompressor 2. If the turbocompressor does not consume the full power PTV max but rather only a proportion of the current power PTV, a power reserve Pres is left over. According to the prior art, this must not be used for the traction machine 5.

Figure 4:
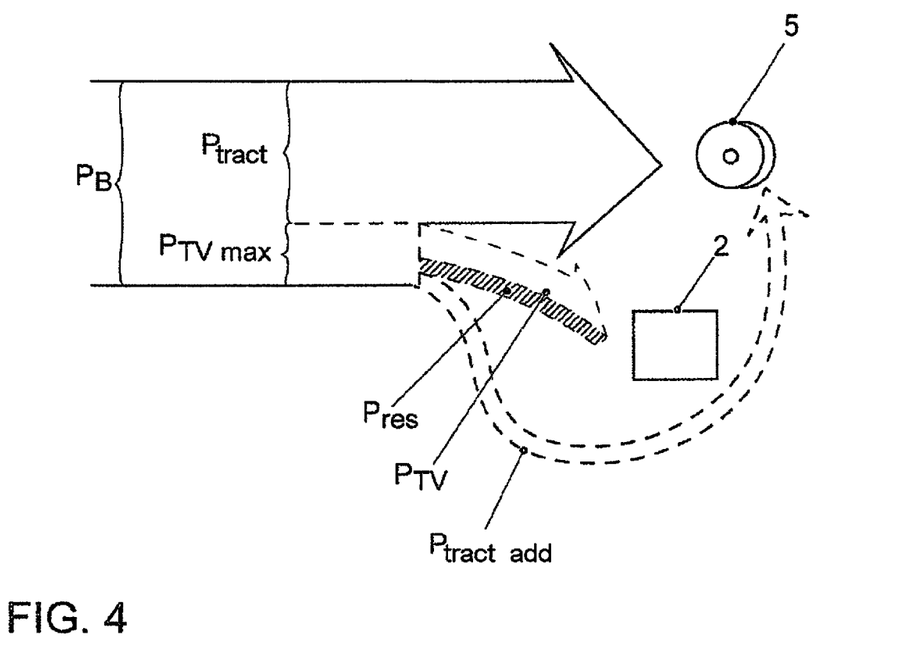
FIG. 4 shows a power branch diagram illustrating power flows in an exemplary embodiment of a means of transportation, which can be electrically driven.

FIG. 4 shows a power flow which is modified in relation to FIG. 3 after all local dynamic processes (intended to mean all dynamic processes which are relevant for this purpose) of a power PB which is provided in the vehicle electrical system have died away, wherein the electrical power PTV which is consumed by the turbocompressor 2 is unchanged in comparison to FIG. 3. However, the power reserve Pres turns out to be considerably lower, for which reason additional power Ptract add can be provided to the traction machine 5. Accordingly, acceleration processes and other high load states can be managed better.

Figure 5:
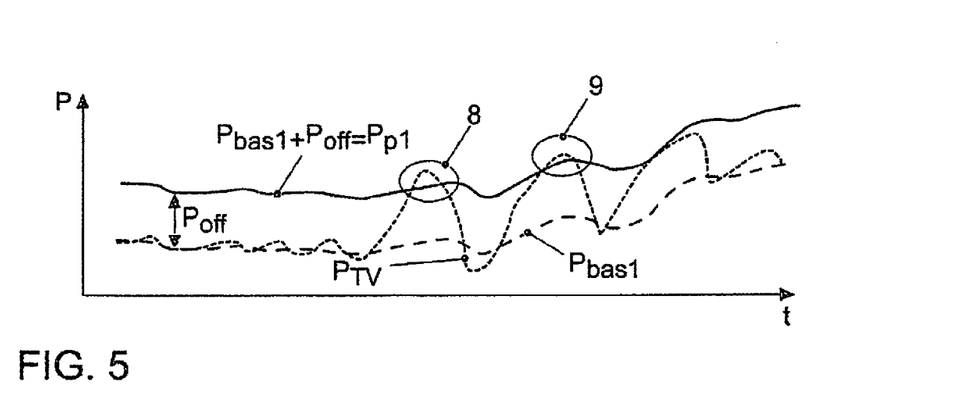
FIG. 5 shows power/time graphs illustrating the relationships between instantaneous powers, a base value, a static offset and an adjusted base value.

FIG. 5 illustrates a process when creating a power reserve Pp1. In this case, a current power consumption PTV of a turbocompressor is smoothed over time, wherein the generated base value function Pbas1 or the generated base value follows the "base line" for the power PTV. An offset Poff which is substantially constant over time is added to this base value function Pbas1. The result is shown as Pp1. It is clear that the power requirement PTV of the turbocompressor in the regions 8, 9 is greater than that of the buffer store Pp1 which is kept ready.

Figure 6:
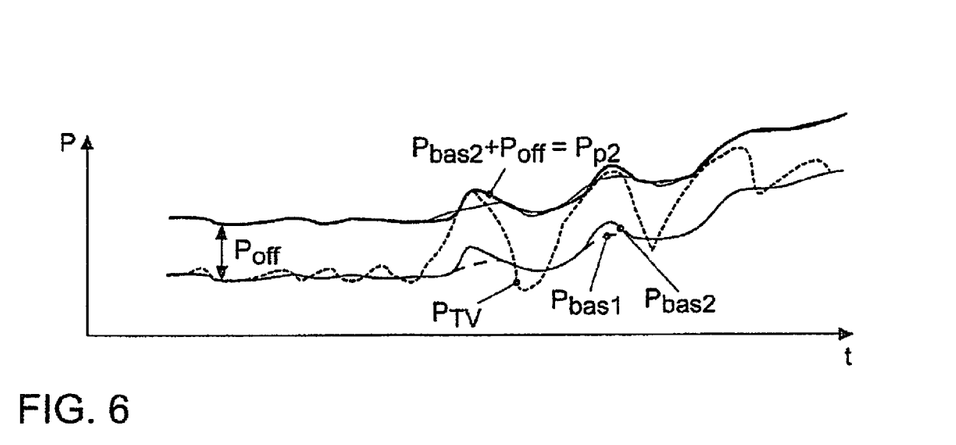
FIG. 6 shows power/time graphs illustrating the relationships between instantaneous powers, a base value, a static offset and an adjusted base value.

FIG. 6 shows a measure for avoiding the problem illustrated in FIG. 5. In this case, the base value Pbas1 in the regions 8, 9 is raised in accordance with the difference between the power PTV and the power reserve Pp1. The result is illustrated as Pbas2. If the modified base value Pbas2 is increased by the stationary offset Poff, which is known from FIG. 5, to a modified power Pp2 which is kept ready, all of the regions of the power PTV of the turbocompressor can be provided from the vehicle electrical system without delay, without the power consumption of other loads first having to be reduced for this purpose.

Figure 7:
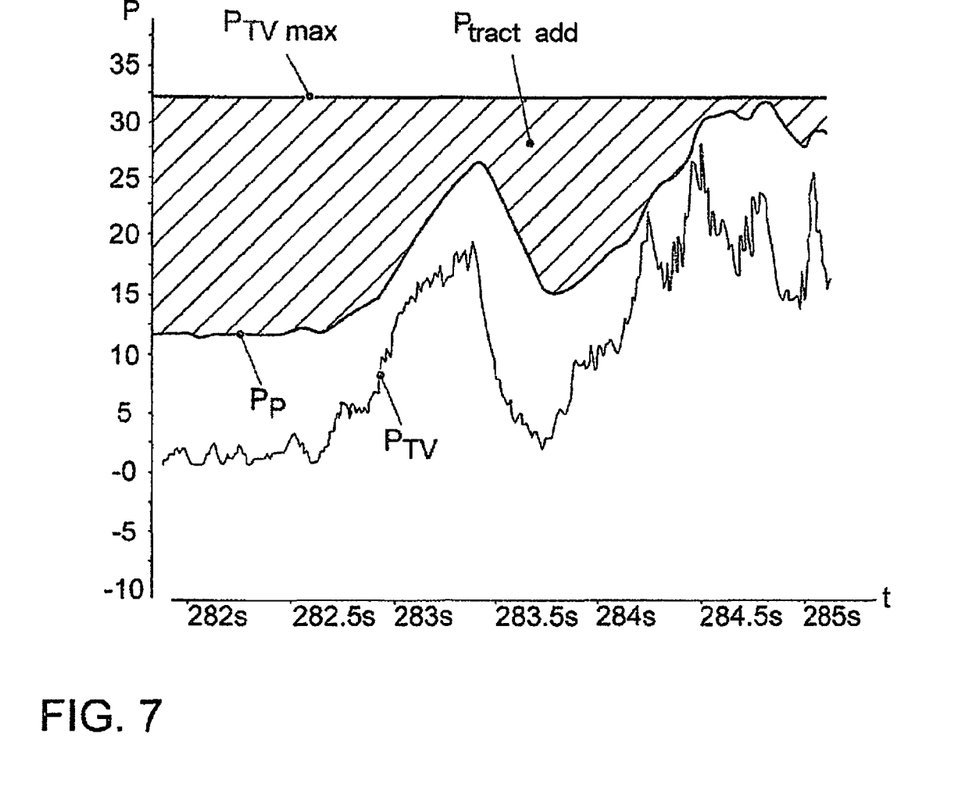
FIG. 7 shows a power/time graph illustrating a smoothing process.

FIG. 7 shows a possible way of reducing the power Pp which is reserved for the turbocompressor. The result is an increased power Ptract add, which is released, in comparison to the maximum power consumption PTV max of the turbocompressor which is kept ready in the prior art.

Figure 8:
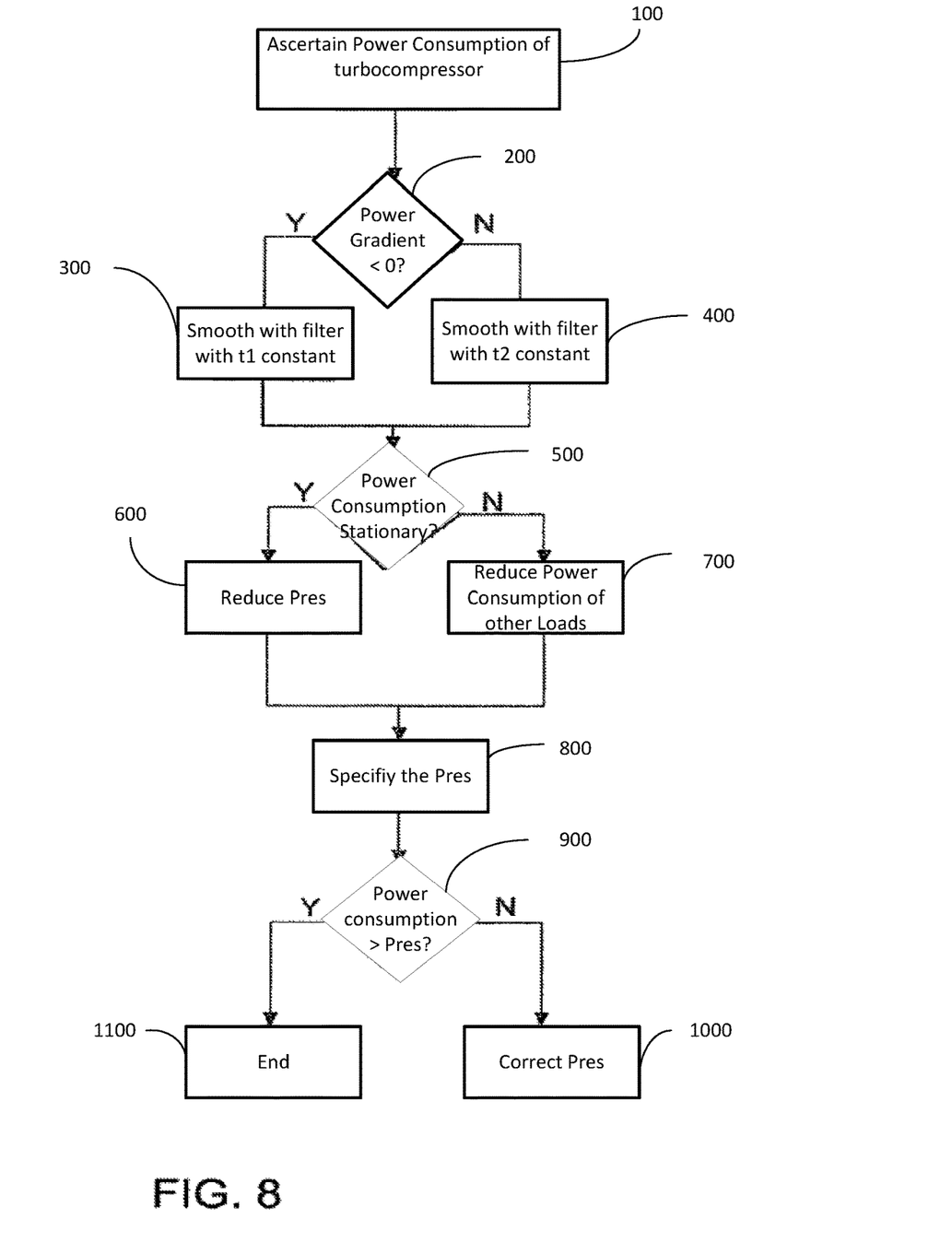
FIG. 8 shows a flowchart illustrating operations of an exemplary embodiment of a disclosed method.

FIG. 8 shows the operations of a method according to an exemplary embodiment. In operation at 100, the power consumption behavior of a turbocompressor at a first time is ascertained. This can be done, for example, by measuring a current through the turbocompressor knowing the vehicle electrical system voltage/island electrical system voltage. In operation at 200, a check is made to determine whether the power gradient of the power of the turbocompressor is less than 0. If this is the case (Y), in operation at 300, the power of the turbocompressor is smoothed by a filter with a time constant t1 to create or to correct a base value. If the power gradient is not less than 0 (N), a filter with a time constant t2 is used for smoothing the power of the turbocompressor in operation at 400. In this exemplary embodiment, t1<t2. In operation at 500, a check is then made to determine whether the consumed electrical power of the turbocompressor is stationary. If this is the case (Y), the power reserve Pres is reduced and vehicle electrical system power for other loads (for example, a traction machine) is mobilized in operation at 600. However, if the power is not stationary (N), the power reserve Pres is increased to a previously defined maximum value (or normal value or default value) and, to this end, the power consumption of other loads in the vehicle electrical system may be reduced in operation at 700. In operation at 800, the buffer store is then correspondingly specified. For example, a static offset which was previously ascertained in operations at 600 or 700 is added to the base values which were ascertained in operations at 300 and 400, to define the power reserve over time.

In operation at 900, a check is made to determine whether the current power consumption of the turbocompressor is greater than the electrical power which is reserved for the turbocompressor. In other words, a check is made to determine whether the electrical power which is required for a setpoint starting power of the turbocompressor is provided at the terminals of the turbocompressor. If this is not the case, the power reserve which was specified in operation at 800 is corrected in operation at 1000. In this case, the base value which was specified in operations at 300 and, respectively, 400 can be increased at times of insufficient power reserve in such a way that it is produced from the power value of the turbocompressor diminished by the static offset. In other words, the power reserve is automatically increased to a value which corresponds to the current electrical power consumption of the turbocompressor. If, in contrast, it is ascertained in operation at 900 that the power which is made available is identical to or greater than the current power requirement of the turbocompressor, the method ends in operation at 1100.

A buffer store is provided to take into account the dynamics of the turbocompressor for operation of a fuel cell. In this context, although a static buffer store can help to reliably satisfy the power requirement of the turbocompressor, it has also been identified, on the other hand, that a vehicle electrical system which is designed in this way falls short of the theoretical possibilities (for example, for boosting the battery of the vehicle). Therefore, the reservation operation takes place only when the maximum line of the fuel cell has not yet been reached. It is only at maximum power that dynamic processes by the turbocompressor are no longer predicted and the power reserve can be reduced. If less power than the maximum power is required by the fuel cell at a later time, the power reserve can be increased again to prepare for any dynamic processes.

Even though the disclosed embodiments have been described in detail and explained in conjunction with the appended figures in the drawing, modifications to and combinations of features of the illustrated exemplary embodiments are possible by a person skilled in the art, without departing from the scope of the disclosed embodiments, the scope of protection of which is defined by the appended claims.

LIST OF REFERENCE SYMBOLS

1 Fuel cell
2 Turbocompressor
3 Battery
4 Electrical lines
5 Traction machine
6 Heater
7 Air-conditioning system
8, 9 Problematic power regions
10 Vehicle electrical system
100-1100 Method operations
$P_{res}$ Power reserve for dynamic processes of the turbocompressor
$P_p$ Power which is reserved for the turbocompressor
$P_{TV\,max}$ Maximum power consumption of the turbocompressor
$P_{tract\,add}$ Additional power which is available for the traction machine
Rotation speed
$n_{TV}$ Rotation speed of the turbocompressor
$P_B$ Vehicle electrical system power
$P_{tract}$ Power of the traction machine
$P_{bas1,2}$ Base values, base value functions
$P_{off}$ Power offset
$t_d$ Predefined time delay

The invention claimed is:

1. A method for operating an electrically driven transportation vehicle electrical system, the method comprising:
    ascertaining a current electrical power consumption of a component of the electrically driven transportation vehicle with dynamic power consumption behavior at a first time;
    providing a base value by smoothing the power consumption behavior over time;
    defining a power reserve for the component by adding a static power offset to the base value; and
    limiting a vehicle electrical system power available for a traction machine of the electrically driven transportation vehicle for providing the defined power reserve,
    identifying a stationary operating state of the component, during which the component consumes a maximum electrical power, and in response to this
    reducing the power reserve to the electrical power currently consumed by the component.

2. The method of claim 1, further comprising:
    identifying that the current electrical power consumption of the traction machine at a second time is greater than the power reserve, and in response to this, increasing the power reserve at least to a value corresponding to the current electrical power consumption of the component at the second time.

3. The method of claim 2, further comprising correcting the base value at those points at which the current electrical power consumption of the component at the second time is greater than the power reserve.

4. The method of claim 3, further comprising using the corrected base value at a later third time as a new corrected base value.

5. The method of claim 1, wherein the power reserve is reduced in increments over time.

6. The method of claim 1, wherein the power reserve is reduced after a predefined time period since the stationary operating state was identified.

7. The method of claim 1, wherein the power reserve is reduced continuously.

8. The method of claim 1, wherein the component is selected from the following list:
    air-conditioning compressor,
    turbocompressor,
    screw-type compressor,
    hydraulic assembly,
    (PTC) heater,
    electric motor,
    power electronics system,
    charging device.

9. The method of claim 1, wherein
    electrical energy is supplied to an island electrical system by a fuel cell, and
    the component comprises an auxiliary assembly of the fuel cell in the form of a turbocompressor.

10. The method of claim 1, wherein, during smoothing, edge gradients of the power consumption behavior over time are reduced such that sections with a positive gradient are smoothed to a lesser extent than sections with a negative gradient.

11. An island electrical system arrangement for an electrically driven transportation vehicle, the arrangement comprising:
- a component with dynamic power consumption behavior;
- an electrical energy source for supplying the island electrical system;
- a processing unit; and
- a detection unit, wherein the island electrical system arrangement:
- ascertains a current electrical power consumption of the component of the electrically driven transportation vehicle with dynamic power consumption behavior at a first time;
- provides a base value by smoothing the power consumption behavior over time defining a power reserve for the component by adding a static power offset to the base value; and
- limits a vehicle electrical system power available for the traction machine of the electrically driven transportation vehicle for providing the defined power reserve,
- identifies a stationary operating state of the component, during which in which state the component consumes a maximum electrical power, and in response to this
- reduces the power reserve to the electrical power currently consumed by the component.

12. An electrically driven transportation vehicle comprising an island electrical system arrangement as claimed in claim 11.

* * * * *